US010717451B2

(12) United States Patent
Aaron et al.

(10) Patent No.: US 10,717,451 B2
(45) Date of Patent: Jul. 21, 2020

(54) AGGREGATE TRAIN AND METHODS OF LOADING AND UNLOADING

(71) Applicant: GEORGETOWN RAIL EQUIPMENT COMPANY, Georgetown, TX (US)

(72) Inventors: Charles W. Aaron, Georgetown, TX (US); Joshua A. Graham, Austin, TX (US)

(73) Assignee: GEORGETOWN RAIL EQUIPMENT COMPANY, Georgetown, TX (US)

(*) Notice: Subject to any disclaimer, the term of this patent is extended or adjusted under 35 U.S.C. 154(b) by 0 days.

(21) Appl. No.: 16/373,059

(22) Filed: Apr. 2, 2019

(65) Prior Publication Data

US 2019/0225242 A1 Jul. 25, 2019

Related U.S. Application Data

(62) Division of application No. 15/617,856, filed on Jun. 8, 2017, now Pat. No. 10,286,929.

(Continued)

(51) Int. Cl.
*B65F 3/00* (2006.01)
*B61D 3/16* (2006.01)
(Continued)

(52) U.S. Cl.
CPC .............. *B61D 3/16* (2013.01); *B61D 7/00* (2013.01); *B61D 7/12* (2013.01); *B61D 15/00* (2013.01); *B65G 67/24* (2013.01); *E01B 27/022* (2013.01)

(58) Field of Classification Search
CPC .................. B60P 1/38; B60P 1/52; B65F 3/28
(Continued)

(56) References Cited

U.S. PATENT DOCUMENTS 2,821,433 A 1/1958 Hamlet
4,116,485 A 9/1978 Svensson
(Continued)

FOREIGN PATENT DOCUMENTS

DE 2447635 A1 4/1975
EP 2194189 A2 6/2010
(Continued)

OTHER PUBLICATIONS

International Searching Authority European Patent Office; International Search Report and Written Opinion; PCT/US2017/036738; dated Aug. 22, 2017.
(Continued)

*Primary Examiner* — Saul Rodriguez
*Assistant Examiner* — Willie Berry, Jr.
(74) *Attorney, Agent, or Firm* — Parsons Behle & Latimer (57) ABSTRACT

A system to transport and unload bulk materials includes at least one rail car and a moving wall system. The moving wall system has a first end, a second end, and a trough. The trough is configured to contain a payload of the at least one rail car. The trough includes sidewalls that contact the payload when loaded and move with the payload to move the payload towards the second end. The trough may be formed of at least one conveyor belt that forms a hopper of the at least one rail car. The trough may span a plurality of rail cars. The system may include a take-up system connecting the sidewalls. Each of the rail cars may include a frame and a plurality of pulleys connected to the frame may support the trough.

22 Claims, 7 Drawing Sheets

Related U.S. Application Data (60) Provisional application No. 62/348,086, filed on Jun. 9, 2016.

(51) Int. Cl.
  *E01B 27/02* (2006.01)
  *B61D 7/00* (2006.01)
  *B61D 15/00* (2006.01)
  *B61D 7/12* (2006.01)
  *B65G 67/24* (2006.01)

(58) Field of Classification Search
  USPC ........ 414/333, 528; 198/823, 824, 827, 828, 198/836.1
  See application file for complete search history.

(56) References Cited

U.S. PATENT DOCUMENTS

| | | | |
|---|---|---|---|
| 6,068,927 A | 5/2000 | Stenman | |
| 7,988,403 B2 * | 8/2011 | Ricketts | B60P 1/36 414/505 |
| 8,256,354 B2 * | 9/2012 | Aaron | B60P 1/165 105/239 |
| 9,580,874 B2 | 2/2017 | Millsaps, II | |
| 2014/0083822 A1 | 3/2014 | Swinderman et al. | |
| 2014/0271071 A1 * | 9/2014 | Aaron | B61D 7/32 414/528 |

FOREIGN PATENT DOCUMENTS

| | | |
|---|---|---|
| JP | 2013233865 A | 11/2013 |
| WO | WO2006038122 A1 | 6/2010 |
| WO | WO2010101868 A1 | 9/2010 |

OTHER PUBLICATIONS

U.S. Patent and Trademark Office; Office Action; U.S. Appl. No. 15/617,856; dated Sep. 20, 2017.

U.S. Patent and Trademark Office; Office Action; U.S. Appl. No. 15/617,856; dated May 25, 2018.

* cited by examiner

AGGREGATE TRAIN AND METHODS OF LOADING AND UNLOADING

CROSS REFERENCE TO RELATED APPLICATIONS

The present application is a divisional of and claims priority to U.S. patent application Ser. No. 15/617,856, filed Jun. 8, 2017 and published as 2017/0355385 and entitled "AGGREGATE TRAIN AND METHOD OF LOADING AND UNLOADING," which claims the benefit of priority under 35 U.S.C. § 119 to U.S. Provisional Application No. 62/348,086, filed Jun. 9, 2016, entitled "AGGREGATE TRAIN AND METHOD OF LOADING AND UNLOADING," the disclosures of each are incorporated herein by reference in their entireties.

BACKGROUND

Field of the Disclosure

The embodiments described herein relate to systems and methods of delivering a material called rip rap more efficiently in the rail road industry. It is appreciated that the embodiments may be used with various types of commodities and aggregates, such as ranging from sand to rip rap.

Description of the Related Art

Rip rap is an aggregate material made up of large boulders that are generally sharp and jagged, which range in diameter between one to six feet. Rip rap is used in the rail road industry to fill in washouts, along bridge embankments, and waterways for erosion control, etc. Known delivery methods include trucking in the rip rap material to the desired site or using side dump cars to deliver the rip rap material. Both of these methods are time consuming and require extensive handling. The more common method in the rail industry for rip rap delivery would be the use of side dump cars. When a side dump car dumps the rip rap, they generally dump only one or two cars at a time. A front end loader or excavator will then have to move the rip rap into the desired location. The side dump cars are repeatedly moved back and forth from the main line track to a siding in order to offload all of the material.

Known trains such as a Georgetown Rail Equipment Company Dump Train and trains described in U.S. patent application Ser. No. 14/199,080, filed Mar. 6, 2014 and entitled "Self-Unloading Aggregate Train", the disclosure of which is incorporated by reference in its entirety, and Plasser MFS cars convey material to the front of the train. The Plasser MFS cars may be able to handle very small-sized rip rap but are unable to handle the rip rap on a larger scale. Further, Plasser MFS cars are very costly and impractical when many car loads of material are required. Further, while the Georgetown Rail Equipment Company Dump Train is more cost effective for multiple car loads, it may not be designed to handle large or even small sized rip rap.

Track spoils are unwanted material that is removed from within or below the ballast, which supports the track. Many known high-production track maintenance machines have a short conveyor boom for offloading track spoils, such as track under-cutters, shoulder cleaners, and ditch cleaners. However, these short booms can only off load material to the side of the track or into the rear of a rail car positioned ahead of the boom. It is often impractical to put the track spoils off to the side of the track because it clogs the ditch or there is double or triple tracks and the boom cannot be swung over the adjacent track. Further, unloading track spoils into the rear of a rail car positioned ahead of the machine is impractical because only half the car can be filled by the short boom and then the car must be dumped or swapped with an empty car. This can take up a lot of valuable track time.

SUMMARY

The present disclosure is directed to a system and method of loading and unloading materials, such as rip rap, that overcomes and/or mitigates some of the problems and disadvantages discussed above.

The embodiments of an aggregate train described herein increase the efficiency and effectiveness of delivering materials, such as rip rap, in the rail industry and may decrease the track time used for unloading and thereby put a rail line back into service more quickly than known systems and methods. The embodiments may also be configured to receive large quantities of track spoils at the rear of the train so they can be hauled to and unloaded at another location.

An embodiment of a system to transport and unload bulk materials includes at least one rail car and a moving wall system. The moving wall system has a first end, a second end, and a trough. The trough is configured to contain a payload of the at least one rail car. The trough includes sidewalls that contact the payload when loaded and move with the payload to move the payload towards the second end.

The at least one rail car may be a plurality of rail cars and the trough may span the plurality of rail cars. The trough may include a moving floor. Each of the at least one rail car may include a frame and the moving wall system may include a plurality of pulleys connected to the frame with the trough supported upon the plurality of pulleys. At least one of the plurality of pulleys may be a driven pulley. The system may include a drive mechanism configured to impart friction to an underside of the trough to move the trough. The sidewalls may include a first sidewall and a second sidewall. The system may include a take-up system connecting the first sidewall and the second sidewall. The take-up system is configured to transfer tension between the first sidewall to the second sidewall. The at least one rail car may not include a hopper separate from the trough.

The trough may be at least one conveyor belt. The at least one conveyor belt may be positionable between a carry configuration and a return configuration. The carry configuration may form the trough when the at least one conveyor belt is advancing towards the second end. The sidewalls may include a pair of sidewall conveyor belts and the moving floor may be a floor conveyor belt. The at least one conveyor belt may include the pair of sidewall conveyor belts and the floor conveyor belt. The pair of sidewall conveyor belts and the floor conveyor belt are rotatable to move the payload.

An embodiment of a system to transport and unload bulk materials includes a conveyor belt system and at least one rail car. The conveyor belt system has at least one conveyor belt, a first end, and a second end. The conveyer belt system forms a hopper of the at least one rail car. The conveyor belt system is configured to contain a payload and move the payload toward the second end by rotating the at least one conveyor belt. The at least one conveyor belt forms sidewalls and a floor that move with the payload when rotated. The at least one rail car is configured to support the conveyor belt system.

The at least one conveyor belt may be positionable between a carry configuration and a return configuration.

The carry configuration may form a trough when the at least one conveyor belt is advancing towards the second end. The at least one rail car may be a plurality of rail cars and the conveyor belt system may span the plurality of rail cars. The sidewalls may include a pair of sidewall conveyor belts and the floor may include a floor conveyor belt. The at least one conveyor belt may be a plurality of conveyor belts including the pair of sidewall conveyor belts and the floor conveyor belt. Each of the at least one rail car may include a frame and the moving wall system may include a plurality of pulleys connected to the frame with the at least one conveyor belt being supported upon the plurality of pulleys. At least one of the plurality of pulleys may be a driven pulley. The system may include a drive mechanism configured to impart friction to an underside of the at least one conveyor belt to rotate the at least one conveyor belt. The sidewalls may include a first sidewall and a second sidewall. Each of the at least one rail car may include a frame having a first track with a first set of rollers and a second track with a second set of rollers. The first set of rollers ride within the first track and the second set of rollers ride within the second track. The first set of rollers may be connected to an upper portion of the first sidewall and the second set of rollers may be connected to an upper portion of the second sidewall.

The system may include a take-up system connecting the first sidewall and the second sidewall. The take-up system is configured to transfer tension between the first sidewall to the second sidewall. Each of the at least one rail car may include a frame having a first track with a first trolley and a second track with a second trolley. The first trolley may be connected to the first sidewall and the second trolley may be connected to the second sidewall. The take-up system may include a third track with a third trolley. The third trolley may apply and maintain tension to a floor conveyor. The tension applied to the third trolley may be independent of the tension applied to the first and second trolleys. In some embodiments, the tension within the first and second trolleys that is applied to the first and second sidewalls may be proportional to the tension applied to the floor conveyor through the third trolley. The take-up system may have one or multiple cables that are routed around to each of the trolleys at a differing number of connection points for each trolley to determine the proportional ratio of tension applied to each trolley.

An embodiment of a method of loading or unloading material from a train includes depositing material onto a conveyor belt system and rotating the at least one conveyor belt. The conveyor belt system spans at least one rail car of a train. The conveyor belt system has at least one conveyor belt, a first end, and a second end. The at least one conveyor belt forms sidewalls and a floor. Rotating the at least one conveyor belt moves the material toward the second end.

The method may include positioning the at least one conveyor belt in a carry configuration forming a trough shape at or near the first end of the conveyor belt system. The material is deposited into the trough shape. The method may include positioning the at least one conveyor belt in a return configuration at or near the second end of the conveyor belt system. The return configuration may not form the trough shape. The method may include containing the material within the at least one conveyor belt while the train is in transport. The method may include unloading the material after moving the material toward the second end. The material may include at least rip rap. The method may include depositing the material onto the at least one conveyor belt at a first section of the conveyor belt system, rotating the at least one conveyor belt to move at least a portion of the material to a second section of the conveyor belt system, and depositing an additional material into the first section of the train. The additional material may be track spoils.

The at least one rail car may be a plurality of rail cars and the conveyor belt system may span the plurality of rail cars. Each of the at least one rail car may include a frame and the conveyor belt system may include a plurality of pulleys connected to the frame with the at least one conveyor belt being supported upon the plurality of pulleys. The method may include driving at least one of the plurality of pulleys to rotate the at least one conveyor belt. The method may include imparting friction to an underside of the at least one conveyor belt and rotating the at least one conveyor belt via the friction. The at least one conveyor belt may be a plurality of conveyor belts. The sidewalls may include a pair of sidewall conveyor belts and the floor may be a floor conveyor belt. The plurality of conveyor belts may include the pair of sidewall conveyor belts and the floor conveyor belt. The sidewalls may include a first sidewall and a second sidewall. The system may include a take-up system connecting the first sidewall and the second sidewall. The take-up system may be configured to transfer tension between the first sidewall to the second sidewall.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure as defined by the appended claims.

DESCRIPTION

Figure 1:
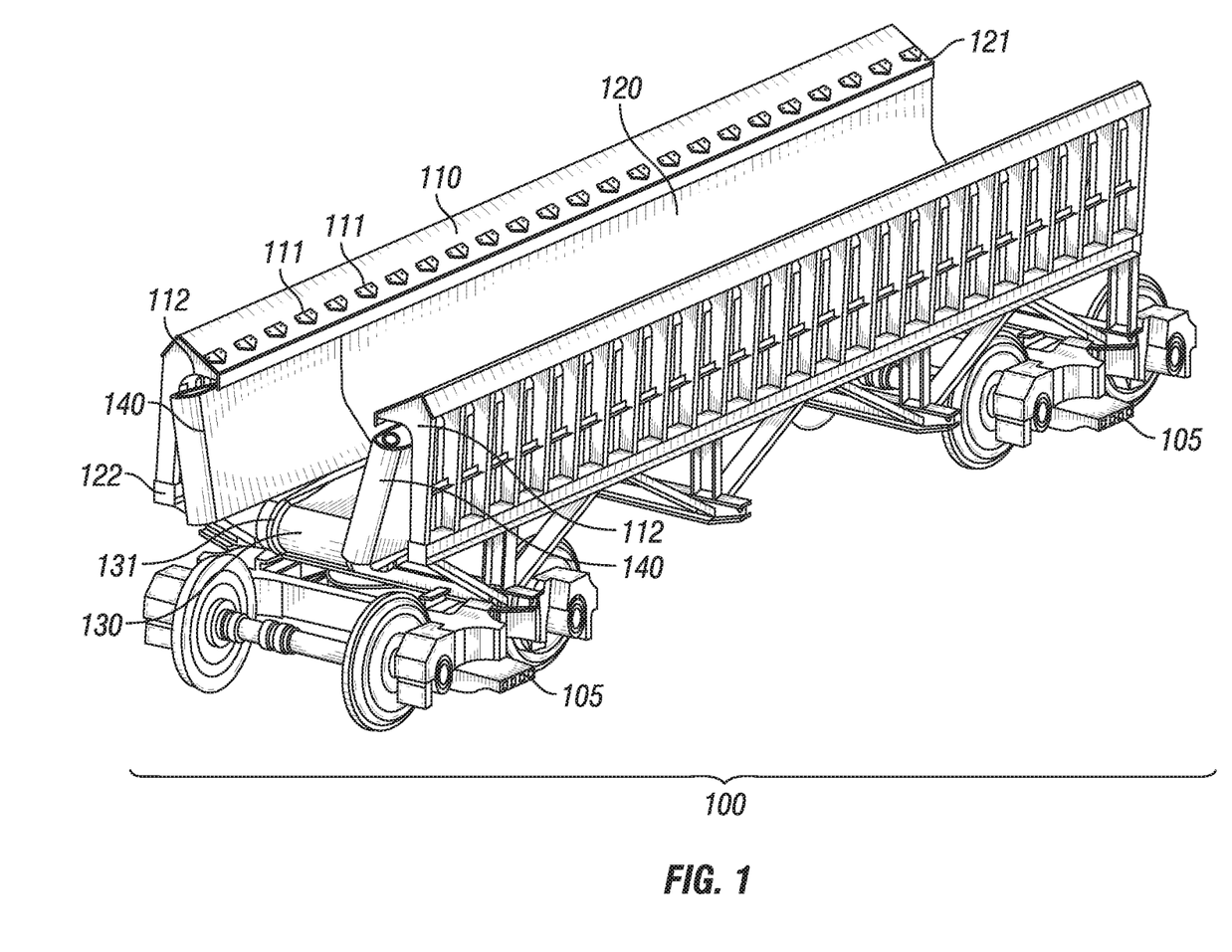
FIG. 1 shows a perspective view of an embodiment of a rail car with a moving wall system.

FIG. 1 shows an embodiment of a rail car 100 with a moving wall system. The rail car 100 includes a frame 110 that extends along the length of the rail car 100 that supports the moving wall system. The frame 110 is supported upon bogies 105 to travel along railroad tracks. As shown in FIG. 1, the frame 110 of the rail car 100 may be supported upon a pair of bogies 105. In other embodiments, adjacent cars may share a bogie 105, as would be appreciated by one of ordinary skill in the art having the benefit of this disclosure.

The moving wall system includes a moving floor and moving sidewalls that form a receptacle for material to be deposited into. The bottom and sides of the moving wall system, which hold and contact material loaded in the rail car 100, move with the material as it is conveyed toward an unloading end 122 of the rail car 100. Unlike rail cars with known conveyor systems, which have a bottom conveyor belt to move material and the material slides along the stationary walls of the hopper, the rail car's 100 moving wall system substantially reduces, and in some embodiments eliminates, sliding friction because the sidewalls of the moving wall system can move with the material. The reduction of sliding friction may increase the payload capacity of the rail car 100 and also decrease the power requirements necessary to move the payload along the length of the rail car 100. The unloading end 122 of the rail car 100 may be located at either end of the rail car 100 depending on the direction of motion of the moving wall system as would be appreciated by one of ordinary skill in the art having the benefit of this disclosure.

As shown in FIG. 1, the moving wall system may be a conveyor belt system 120. The conveyor belt system 120 extends from a first end 121 to a second end 122. Material may be loaded into the rail car 100 at the first end 121 of the conveyor belt system 120 and conveyed to the second end 122 of the conveyor belt system 120. The conveyor belt system 120 includes at least one conveyor belt that forms a receptacle for the material. In other words, the conveyor belt system 120 acts as the hopper for the material that opens to the top of the rail car 100 as the rail car 100 is being transported to a location and the rail car 100 may not include a separate hopper. The payload capacity of the rail car 100 may be increased as there is no space needed to drop material from a hopper onto the conveyor belt system 120. The at least one conveyor belt forms a moving band or endless loop of fabric, rubber, metal, other materials, or combinations thereof that may be used to move objects or bulk materials from one place to another.

The at least one conveyor belt may be made of a highly impact and abrasive resistant material. At the first end 121 of the conveyor belt system 120, the at least one belt is positioned into a carry configuration, such as a trough shape, to contain the rail car's 100 entire payload. At the second end 122 of the conveyor belt system, the at least one belt is positioned into a return configuration so that it may advance back towards the first end. The conveyor belt system 120 may comprise a floor conveyor belt 130 and a pair of sidewall conveyor belts 140. It is appreciated, however, that other embodiments of conveyor belts may be used such as a pair of overlapping conveyor belts, interlocking conveyor belts, or a single curved conveyor belt. Likewise, more than three conveyor belts may be used to create the carry configuration to contain the rail car's 100 payload. As the floor conveyor belt 130 and the sidewall conveyor belts 140 of the conveyor belt system 120 rotate, the material is moved towards the second end 122. The floor conveyor belt 130 may include ridges 131 located inward from the edges of the floor conveyor belt 130 to assist the floor conveyor belt 130 and the sidewall conveyor belts 140 in maintaining a relative position.

The frame 110 may include arms 112 on each side of the conveyor belt system 120 to support the conveyor belt system 120 and the payload that it carries. The arms 112 may include connectors, such as fastener plates 111, to attach the conveyor belt system 120 to the frame 110 of the rail car 100. The arms 112 or another portion of the frame 110 may not contact the floor conveyor belt 130 and the sidewall conveyor belts 140 of the conveyor belt system 120. In particular, the frame 110 may not contact the portion of the floor conveyor belt 130 and the sidewall conveyor belts 140 as they move material from the first end 121 to the second end 122. The arms 112 may extend to the top of the rail car 100 and the sidewall conveyor belts 140 may extend substantially to the top of the rail car 100 to form a hopper to contain the rail car's 100 payload. In some embodiments, material may be loaded onto the floor conveyor belt 130 and the sidewall conveyor belts 140 through an opening in the top of the rail car 100.

Figure 2:
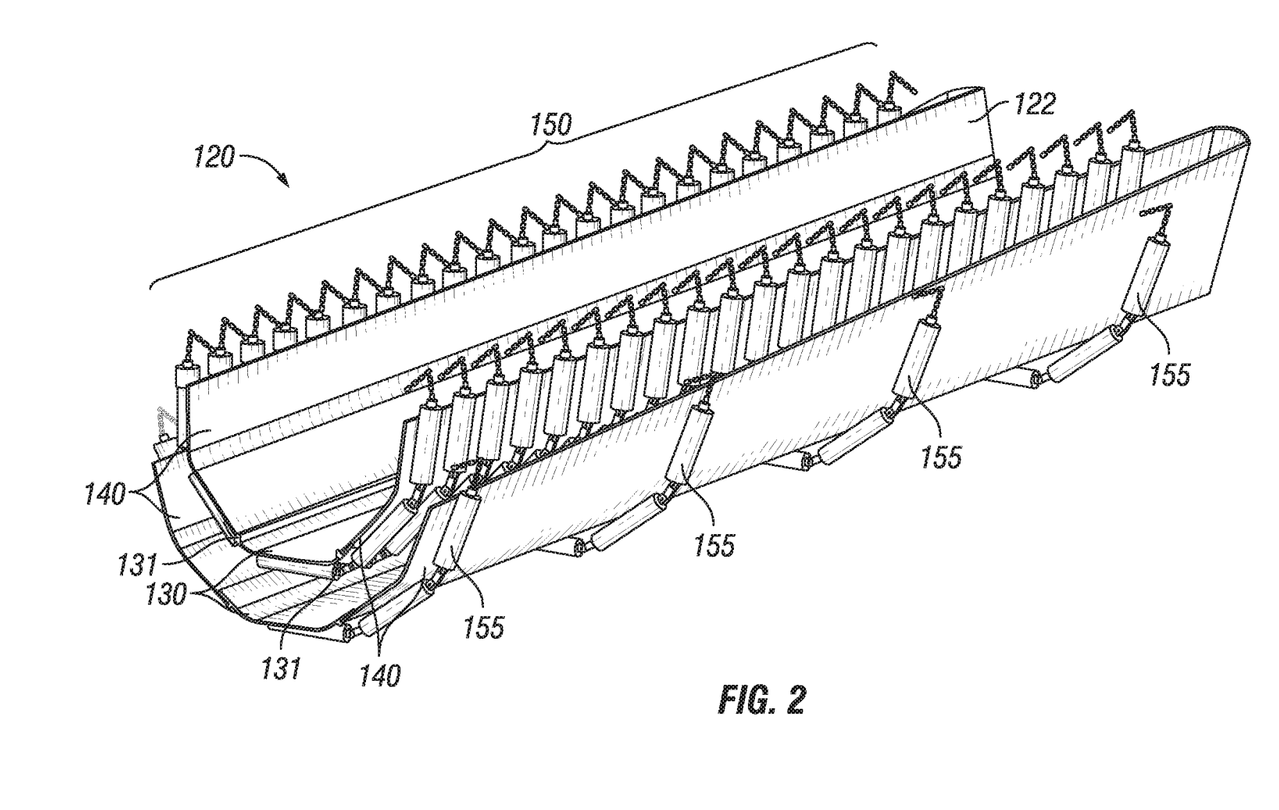
FIG. 2 shows a perspective view of an embodiment of a conveyor belt system with an end portion removed.

FIG. 2 shows the conveyor belt system 120 with the first end 121 portion removed. The conveyor belt system 120 includes supports to allow the floor conveyor belt 130 and the sidewall conveyor belts 140 to move the material without or with reduced friction between the material and a hopper wall. The supports may be suspended from the frame 110 to further reduce sliding friction of the floor conveyor belt 130 and the sidewall conveyor belts 140. As shown in FIG. 2, the supports may be impact resistant idler pulleys 150 positioned beneath the floor conveyor belt 130 and the sidewall conveyor belts 140. The idler pulleys 150 are positioned on the underside of the floor conveyor belt 130 and the sidewall conveyor belts 140 as the floor conveyor belt 130 and the sidewall conveyor belts 140 move toward the second end 122 of the conveyor belt system 120. The idler pulleys 150 may decrease the impact stresses of loading the payload onto the conveyor system and may be spaced to achieve a desired capacity per unit length of the rail car 100. The idler pulleys 150 may be supported upon the arms 112 of the frame 110 (shown in FIG. 3). For examples, the idler pulleys 150 may be linked along a chain or cable and connected via fastener plates 111 (shown in FIG. 3). When material is loaded onto the floor conveyor belt 130 and the sidewall conveyor belts 140 of the conveyor belt system 120, the idler pulleys 150 resist the impact stress. The idler pulleys 150 support the weight of the material and the floor conveyor belt 130 and the sidewall conveyor belts 140 as the floor conveyor belt 130 and the sidewall conveyor belts 140 move the material toward the second end 122 of the conveyor belt system 120. As material is moved toward the second end 122 of the conveyor belt system 120, the idler pulleys 150 rotate above their respective axes as the floor conveyor belt 130 and the sidewall conveyor belts 140 slide along the idler pulleys 150. The conveyor belt system 120 may also include lower idler pulleys 155 that support and guide the floor conveyor belt 130 and the sidewall conveyor belts 140 as they move from the second end 122 to the first end 121 to complete the endless loop. The lower idler pulleys 155 are supported upon the frame 110. Fewer lower idler pulleys 155 may be used than the idler pulleys 150 because the lower idler pulleys 155 may need only support the empty weight of the floor conveyor belt 130 and the sidewall conveyor belts 140.

Figure 3:
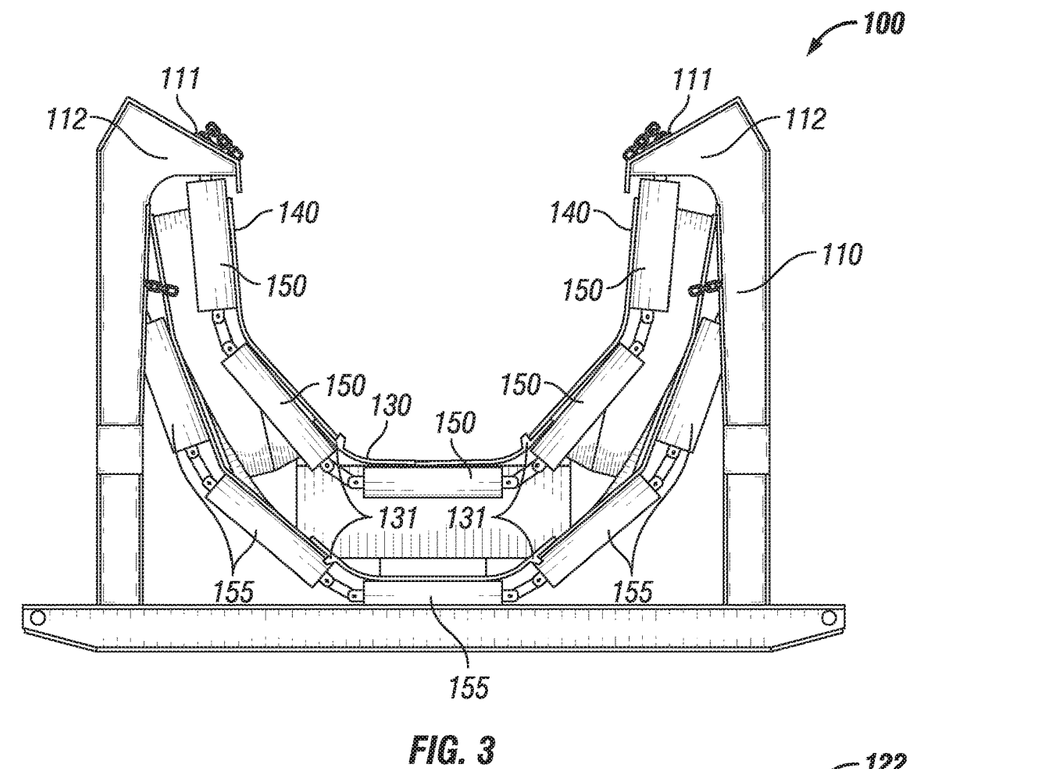
FIG. 3 shows a cross-sectional view of an embodiment of a rail car with a conveyor belt system.

FIG. 3 shows a cross-sectional view of the frame 110 and the conveyor belt system 120 of the rail car 100. The pair of sidewall conveyor belts 140 are positioned on the sides of the floor conveyor belt 130 to form a carry configuration that has a trough shape to receive and carry bulk materials. The trough shape may be a "U" shape with the sidewall conveyor belts 140 positioned substantially perpendicular to the floor conveyor belt 130. Other trough shapes are possible as may be appreciated by one of ordinary skill in the art having the benefit of this disclosure. For example, the trough shape may also be half of a hexagon or an octagon, or part of a semi-circle. As the floor conveyor belt 130 and the sidewall conveyor belts 140 travel in an endless loop, one section of the floor conveyor belt 130 and the sidewall conveyor belts 140 travels from the first end 121 to the second end 122 (shown in FIG. 1) while being supported by the idler pulleys 150 suspended from the arms 112 of the frame 110 via the connection to the fastener plates 111. The idler pulleys 150 rotate as the floor conveyor belt 130 and the sidewall conveyor belts 140 travel across the idler pulleys 150. The ridges 131 located inward from the edges of the floor conveyor belt 130 assist in maintaining the trough shape between the floor conveyor belt 130 and the sidewall conveyor belts 140 as they traverse the length of the rail car 100.

Figure 4:
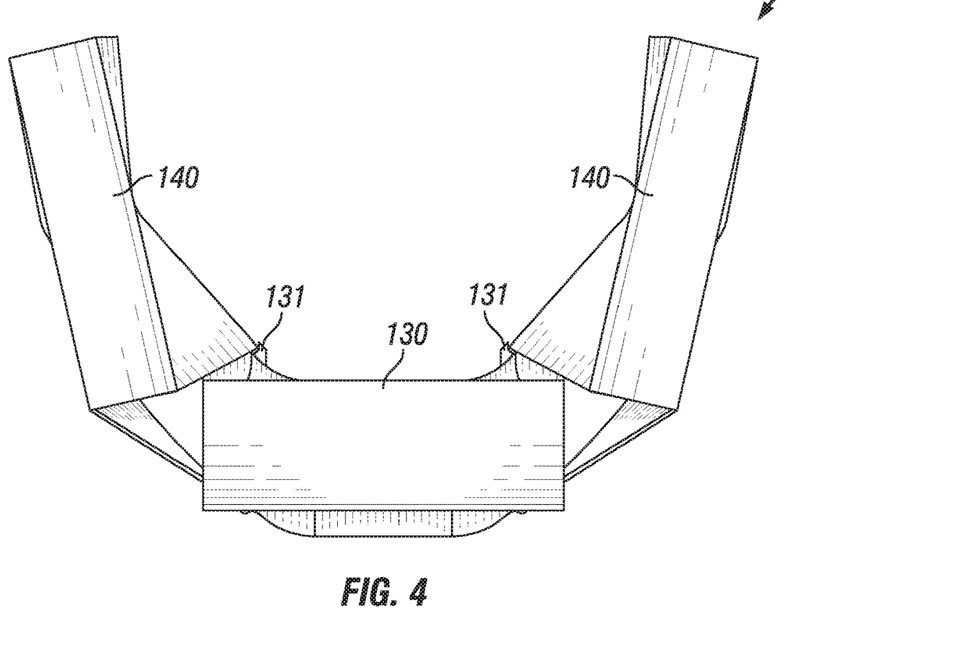
FIG. 4 shows an embodiment of a conveyor belt system having a moving floor and moving sidewalls.

Turning to FIG. 4, once the section of the floor conveyor belt 130 and the sidewall conveyor belts 140 reaches the second end 122, the sidewall conveyor belts 140 are separated from the floor conveyor belt 130 so that the material can be removed. Head pulleys at the second end 122 may be used to separate the sidewall conveyor belts 140 from the floor conveyor belt 130 and transition the floor conveyor belt 130 and the sidewall conveyor belts 140 from the carry configuration to a return configuration. The ends of the sidewall conveyor belts 140 may extend past the end of the floor conveyor belt 130 to assist in separating the sidewall conveyor belts 140 from the floor conveyor belt 130. In some embodiments, the conveyor belt system 120 may not elevate the material from the first end 121 to the second end 122 (shown in FIG. 1). Referring again to FIG. 3, in the return configuration, the section of the floor conveyor belt 130 and the sidewall conveyor belts 140 is guided upon the lower idler pulleys 155 as it travels towards the first end 121 (shown in FIG. 1). The portion of the floor conveyor belt 130 and the sidewall conveyor belts 140 in the carry configuration may be positioned above the portion of the floor conveyor belt 130 and the sidewall conveyor belts 140 in the return configuration. By way of example, in the return configuration, the conveyor belt 130 and the sidewall conveyor belts 140 may be partially overlapping, form a trough, be flat, or completely overlap.

Once the section of the floor conveyor belt 130 and the sidewall conveyor belts 140 reaches the first end 121, tail pulleys may be used to reorient the floor conveyor belt 130 and the sidewall conveyor belts 140 back to the carry configuration and the tail pulleys may also apply proper tension to the floor conveyor belt 130 and the sidewall conveyor belts 140.

Figure 5:
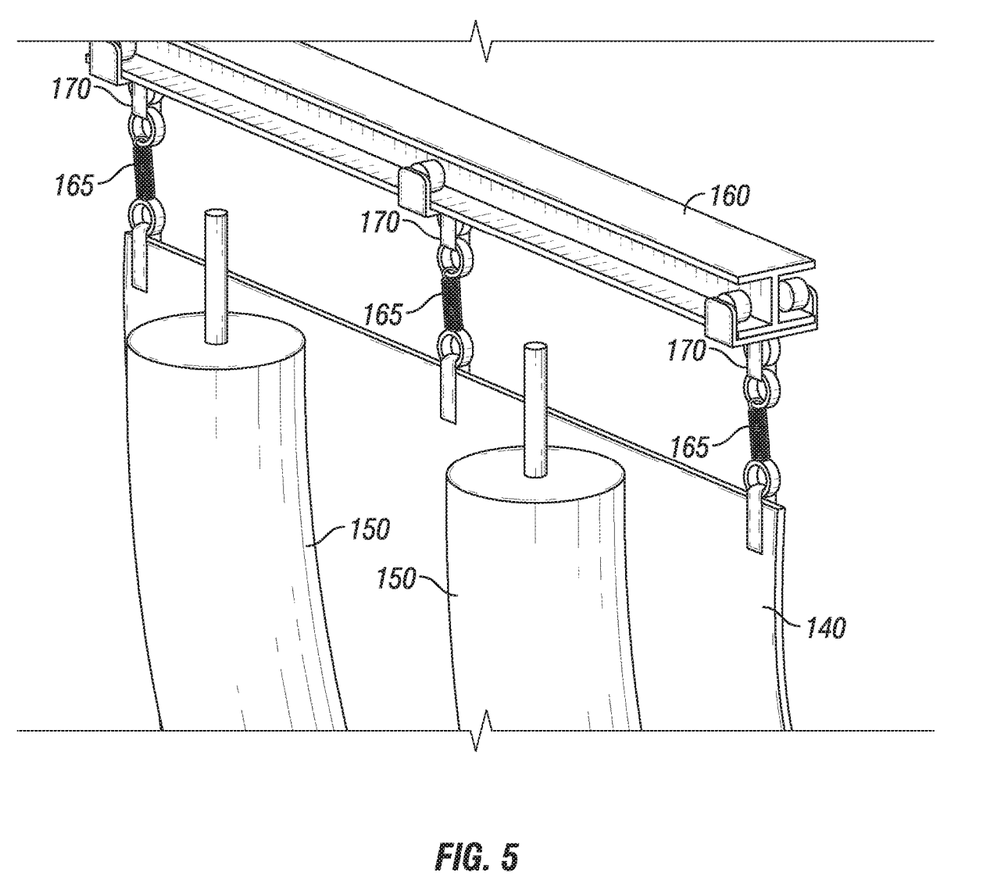
FIG. 5 shows an embodiment of a track system for moving sidewalls.

FIG. 5 shows an embodiment for a track 160 to guide the sidewall conveyor belts 140. It is appreciated that the track 160 may also be used in other embodiments, such as where there is a pair of overlapping conveyor belts or a single curved conveyor belt, as would be appreciated by one of ordinary skill having the benefit of this disclosure. The track 160 may be connected to or integral to the frame 110 of the rail car 100 (shown in FIG. 1). By way of example, the track 160 may have an I-beam shape. A plurality of rollers 170 ride within the track 160. The rollers 170 are connected to the sidewall conveyor belts 140 and inhibit the sidewall conveyor belts 140 from sliding down under its weight or the weight of material upon the sidewall conveyor belts 140. The rollers 170 may be spaced to achieve a desired capacity per unit length of the rail car 100. The rollers 170 may include an elastic member 165, such as a spring or bungie. The elastic member 165 may inhibit the track 160 and rollers 170 from being overloaded when materials are being dropped upon the floor conveyor belt 130 (shown in FIG. 1) and sidewall conveyor belts 140. It is appreciated that the track 160 and rollers 170 may replace or supplement the ridges 131 on the floor conveyor belt 130 (shown in FIG. 3) in maintaining the trough shape between the floor conveyor belt 130 and the sidewall conveyor belts 140 as they traverse the length of the rail car 100. In some embodiments, the track 160 may curve or a second track may be used to guide and support the sidewall conveyor belts 140 as they travel from the second end to the first end.

The rail car 100 may include a drive mechanism, such as driven pulleys, a drive belt, a motor or engine, configured to drive the floor conveyor belt 130 and the sidewall conveyor belts 140. The head pulleys and tail pulleys for the floor conveyor belt 130 and the sidewall conveyor belts 140 may include gear boxes and motors used to drive the pulleys and rotate the respective belt, as would be appreciated by one of ordinary skill in the art having the benefit of this disclosure. In some embodiments, a generator may be positioned on a rail car 100 or on an adjacent car to provide electricity to the head pulleys and idlers. In some embodiments, the drive mechanism may impart friction, such as by rotating the drive mechanism, to the underside of the floor conveyor belt 130 and/or the undersides of the sidewall conveyor belts 140 and cause the floor conveyor belt 130 and/or the sidewall conveyor belts 140 to rotate. Multiple drive mechanisms may be distributed along the length of the conveyor belt system 120. In some embodiments, only the floor conveyor belt 130 is driven. The sidewall conveyor belts 140 may be driven by friction with the material placed against the sidewall conveyor belts 140. In other words, material may be placed on the floor conveyor belt 130 and the sidewall conveyor belts 140, the floor conveyor belt 130 is driven and caused to rotate, and as the floor conveyor belt 130 rotates, it carries some of the material with it and the weight of the material causes the sidewall conveyor belts 140 to move with the material. Therefore, although only the floor conveyor belt 130 is being driven, all three the floor conveyor belt 130 and the sidewall conveyor belts 140 are rotating and moving with material.

In some embodiments, one or more of the idler pulleys 150 that support the conveyor belt system 120 may be driven and cause the floor conveyor belt 130 and sidewall conveyor belts 140 to rotate. For instance, referring to FIG. 2, the floor conveyor belt 130 and sidewall conveyor belts 140 may initially be stationary. The idler pulleys 150 are caused to rotate and the friction between the idler pulleys 150 and the floor conveyor belt 130 and sidewall conveyor belts 140 will cause the floor conveyor belt 130 and sidewall conveyor belts 140 to advance toward the second end 122. In some embodiments, driven idler pulleys 150 that are suspended from the frame (shown in FIG. 3) may begin to rotate but be insufficient to begin moving the loaded material. The rotational friction between the driven idler pulleys 150 and the floor conveyor belt 130 and sidewall conveyor belts 140 may cause the idler pulleys 150 to move along the length of the conveyor belt system 120 toward the second end 122 and pivot about the fastener plates 111 (shown in FIG. 1). As the driven idler pulleys 150 are moved, a state of non-equilibrium is created that opposes gravitational forces. At a certain point, depending on the weight of the load, the gravitational forces will cause the driven idler pulleys 150 to swing about the fastener plates 111 and the floor conveyor belt 130 and sidewall conveyor belts 140 will begin to rotate as the system returns toward the equilibrium state. This may also create a smooth start of movement for the material. Further rotation of the idler pulleys 150 may then continue to the rotation of the floor conveyor belt 130 and sidewall conveyor belts 140. It is appreciated that different drive mechanisms may be used and/or combined. For example, driven idler pulleys 150 may be used to initiate smooth movement of the material on the conveyor belt system 120 and a driven head pulley may then be used to maintain the movement.

Figure 6:
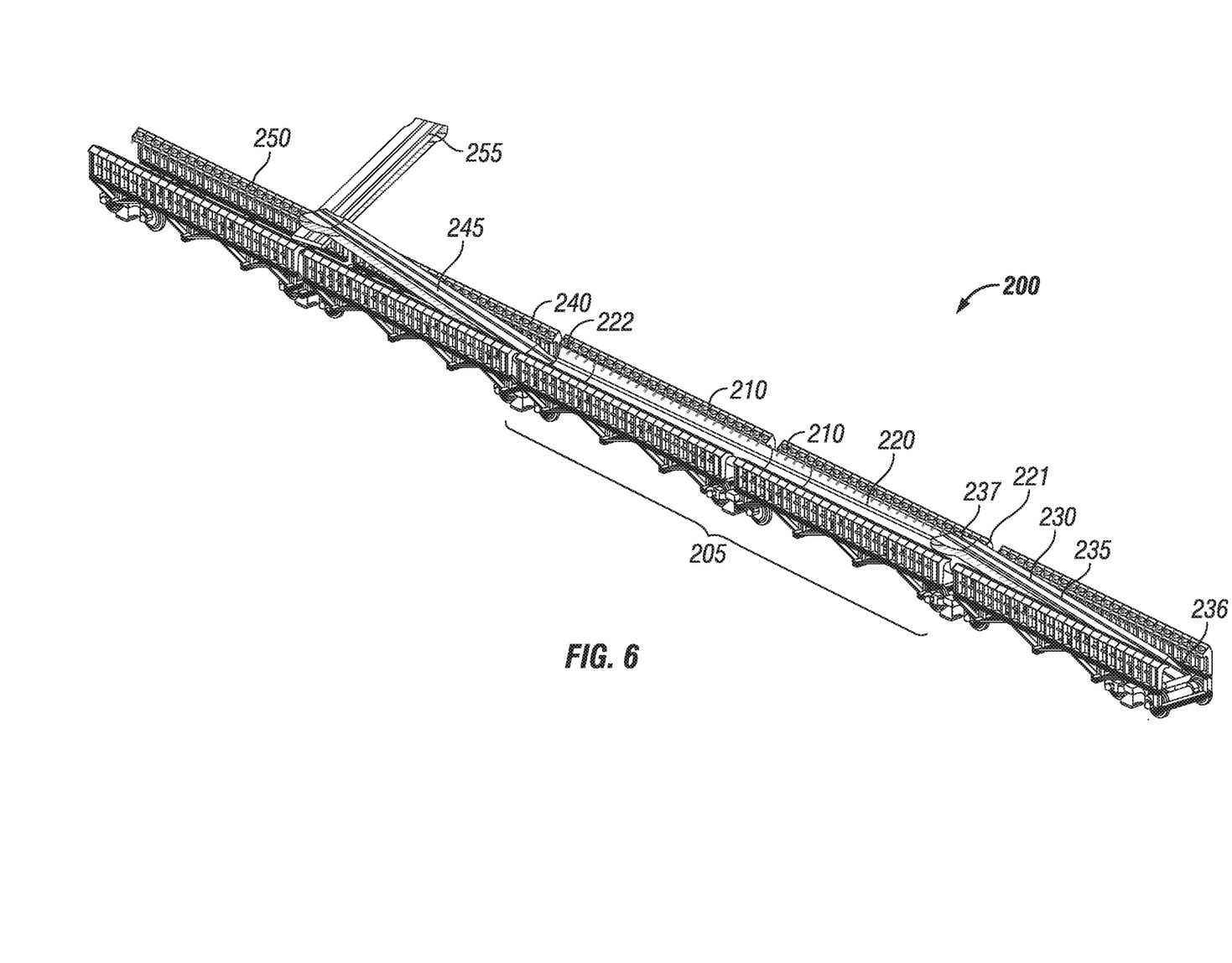
FIG. 6 shows an embodiment of an aggregate train with a payload conveyor belt system.

FIG. 6 shows an embodiment of an aggregate train 200 having a payload conveyor belt system 220. The train 200 may be compliant with at least one of the Association of American Railroads ("AAR") plate F clearance envelope or the AAR plate C clearance envelop. The payload conveyor belt system 220 may have the capacity to receive and contain the entire train 200's payload capacity. The train 200's payload capacity may include, among other things, rip rap ranging from small to large sizes. The full capacity of payload may be contained within the payload conveyor belt system 220 while the belts of the payload conveyor belt system 220 are stationary. For example, the payload conveyor belt system 220 contains the payload after it has been loaded and the train 200 is in transport. The full capacity of payload may also be contained while actively conveying the payload towards an unloading section 250 of the train 200.

The train 200 may include a loading section 230, a middle section 205, and an unloading section 250. The middle section 205 of the train is configured to carry the payload on the conveyor belt system 220. The middle section 205 includes at least one rail car 210. The middle section 205 may include multiple rail cars 210 that form a frame to support the conveyor belt system 220. The payload conveyor belt system 220 may be the conveyor belt system 120 described above with respect to FIGS. 1-5. The payload conveyor belt system 220 includes an endless loop conveyor belt that spans one or more rail cars 210. The conveyor belt may be a plurality of conveyor belts. The plurality of conveyor belts may be three conveyor belts. The conveyor belts may be made of a highly impact and abrasive resistant material.

The payload conveyor belt system 220 may be rotated to move material towards the unloading section 250 of the train. The length and cross section of the payload conveyor belt system 220 within the middle section 205 determines the capacity of the train 200. The cross section of the payload conveyor belt system 220 and the weight capacity of the middle section 205 is limited by railroad standard; thus, the capacity may be increased by building a larger middle section 205 with more rail cars 210.

The unloading section 250 of the train 200 is configured to unload the payload from the train 200. Within the unloading section 250, the payload is removed from the middle section 205, elevated, and placed onto a radial stacker arm conveyor belt 255 for unloading. The stacker arm conveyor belt 255 may be configured so that the radial stacker arm can rotate approximately 180 degrees so the payload can be unloaded to either side or in front of the train 200. In some embodiments, the unloading section 250 is a single car. In some embodiments, the unloading section 250 is a plurality of cars. The unloading section 250 may also include head pulleys configured to transition the payload carry belts of the payload conveyor belt system 220 from a troughed carry configuration to a return configuration. In other embodiments, the head pulleys may be positioned on the rail cars 210 of the middle section 205.

The loading section 230 of the train 200 is configured to deposit materials onto the payload conveyor belt system 220. The loading section 230 may include an additional spoils receiving hopper and conveyor belt 235. The conveyor belt 235 has a first end 236 and a second end 237. The conveyor belt 235 receives payload material and moves the material to the first end 221 of the payload carry belts of the conveyor belt system 220. In some embodiments, the loading section 230 is a single car. In some embodiments, the loading section 230 is a plurality of cars. The loading section 230 of the train 200 may contain tail pulleys configured to transition the payload carry belts of the payload conveyor belt system 220 from their return configuration to their troughed carry configuration. In other embodiments, the trail pulleys may be positioned on the rail cars 210 of the middle section 205.

The train 200 may include four main conveyor belt systems. The conveyor systems include a rear conveyor belt system 235 in the loading section 230, a payload conveyor belt system 220 in the middle section 205, an elevating conveyor belt system 245, and a stacker conveyor belt system 255 in the unloading section 250. The rear conveyor belt system 235 receives track spoils or any other material which may be received at the rearmost part of the train. Material is transferred from the first end 236 to the second end 237 of the rear conveyor belt system 235. The second end 237 may be elevated to more readily transfer material to the first end 221 of the payload conveyor belt system 220. In some embodiments, materials may be deposited directly onto the payload conveyor belt system 220, such that the entire length of the middle section 205 and payload conveyor belt system 220 are designed to withstand the impact associated with dropping the payload from a height above the top of the rail cars 210.

The payload conveyor belt system 220 acts as the hopper for the material during transport and a separate hopper to store payload for transport may not exist. The payload conveyor belt system 220 includes a conveyor belt that forms a receptacle for the material. The receptacle may be a trough shape with the conveyor belt forming the sides of the trough. Various trough shapes are possible as may be appreciated by one of ordinary skill in the art having the benefit of this disclosure. The receptacle may also be formed by more than one conveyor belt. For example, a pair of overlapping conveyor belts may be used or three different conveyor belts may be assembled together.

As would be appreciated by one of ordinary skill in the art having the benefit of this disclosure, the use of a single conveyor belt may limit the capacity of the payload conveyor belt system 220. For example, it may be difficult and/or expensive to transition a 16-foot wide belt from its carry position to its return position within the width constraints within an AAR Plate C or Plate F. However, a narrower single belt may be more easily transitioned within these width constraints. Also, a plurality of belts may be more easily transitioned within the width constraints and combined to achieve an overall desired width of the payload conveyor belt system 220. The costs of narrower belts may also be reduced from a single belt. It is further appreciated that the capacity of a payload conveyor belt system 220 with a smaller total belt width will be reduced and a longer train could be used to achieve the same capacity.

The payload conveyor belt system 220 may include a plurality of conveyor belts that are combined to achieve the desired total belt width. Toward the loading section 230 of the train 200, the plurality of conveyor belts are positioned relative to each other to form a trough shape to receive and carry the payload within the middle section 205 of the train 200. The plurality of conveyor belts maintain the trough shape throughout the middle section 205 of the train 200. Beneath the payload conveyor belt system 220, a series of high impact resistant drive pulleys and idler pulleys may be positioned to decrease the impact stresses of loading the payload onto the payload conveyor belt system 220 and to achieve a desired capacity per unit length of the rail cars 210. Rotation of the payload conveyor belt system 220 moves material from the first end 221 to the second end 222. Toward the unloading section 250, the plurality of conveyor belts are separated so the material can be removed from the conveyor belts. The plurality of conveyor belts may be positioned such that the conveyor belts will not spill material during transport, loading, or unloading. The conveyor belt system 220 may not elevate the material from the first end 221 to the second end 222. From the payload conveyor belt system 220, the material is transferred to the elevating conveyor belt system 245 which elevates the material to a loading zone of a stacker conveyor belt system 255 on a radial stacker arm for unloading the material to its desired location.

During operation, the train 200 might have multiple loaded rail cars 210, containing many hundreds or thousands of tons of material. The train 200 may be configured to advance all of the material towards the unloading section 250 of the train 200 at the same time. As a result, the need to shuffle rail cars to and from the unloading site is reduced or even eliminated. Therefore, the track may be put back into service much faster and more efficiently.

In some embodiments, the payload conveyor belt system 220 may be divided into multiple payload conveyor belt systems 220 sequentially extending along the length of the train. Each payload conveyor belt system may be supported by one or multiple rail cars 210. In operation, a first section of the payload conveyor belt system 220, which is nearest the unloading section 250 of the train 200, may be operated first. The power needed to convey the material may be reduced because the remaining portion of the payload may remain stationary as first section is being unloaded. Then, a second section of the payload conveyor belt system 220, which is adjacent to the first section, may be operated. Material from the second section is moved to the first section, which is then used as a relay conveyor to move the material to the unloading section 250 of the train. Next, a third section adjacent to the second section may be operated and the first and second sections may be used as a relay conveyor. In this manner, one section may be advanced at a time instead of the entire payload being advanced at the same time.

Aggregate materials may be loaded into the payload conveyor belt system 220 and transported to a location where the materials are unloaded. The aggregate materials may include rip rap. The rip rap may have a diameter of one foot or larger. The aggregate materials may be loaded into the payload conveyor belt system 220 by depositing materials onto a first section of the payload conveyor belt system 220, rotating the payload conveyor belt system 220 to move the material toward the unloading section 250, and then depositing additional material into the first section of the payload conveyor belt system 220. In some embodiments, the train 200 can be loaded with different types of aggregates as well, such as rip rap of varying sizes and ballast material. The train 200 may then be used to offload the different types of aggregates sequentially. For example, when fixing a washout, rip rap can be unloaded into the washout to take up the greater part and then finished off with unloading a ballast material that is loaded directly behind the rip rap. The stacker conveyor belt system 255 on the radial stacker arm may be repositioned and the process can be repeated until a washout is filled.

In some embodiments, track spoils may be loaded into the train 200. The track spoils may be loaded into a receiving hopper (not shown) of the loading section 230 and loaded into the payload conveyor belt system 220 via the conveyor belt 235 of the loading section 230. Alternatively, the track spoils may be deposited directly onto the payload conveyor belt system 220. Once the track spoils reach capacity within the region of the payload conveyor belt system 220 receiving the track spoils, the payload conveyor belt system 220 may rotate to advance the track spoils to another section. Additional track spoils may be received and advanced until a job is complete or the payload conveyor belt system 220 has reached capacity. Loading track spoils onto the payload conveyor belt system 220 at a rear section of the train 200 may be beneficial to the production of track maintenance and reduced or eliminate the need to shuffle rail cars to and from the site.

Figure 7:
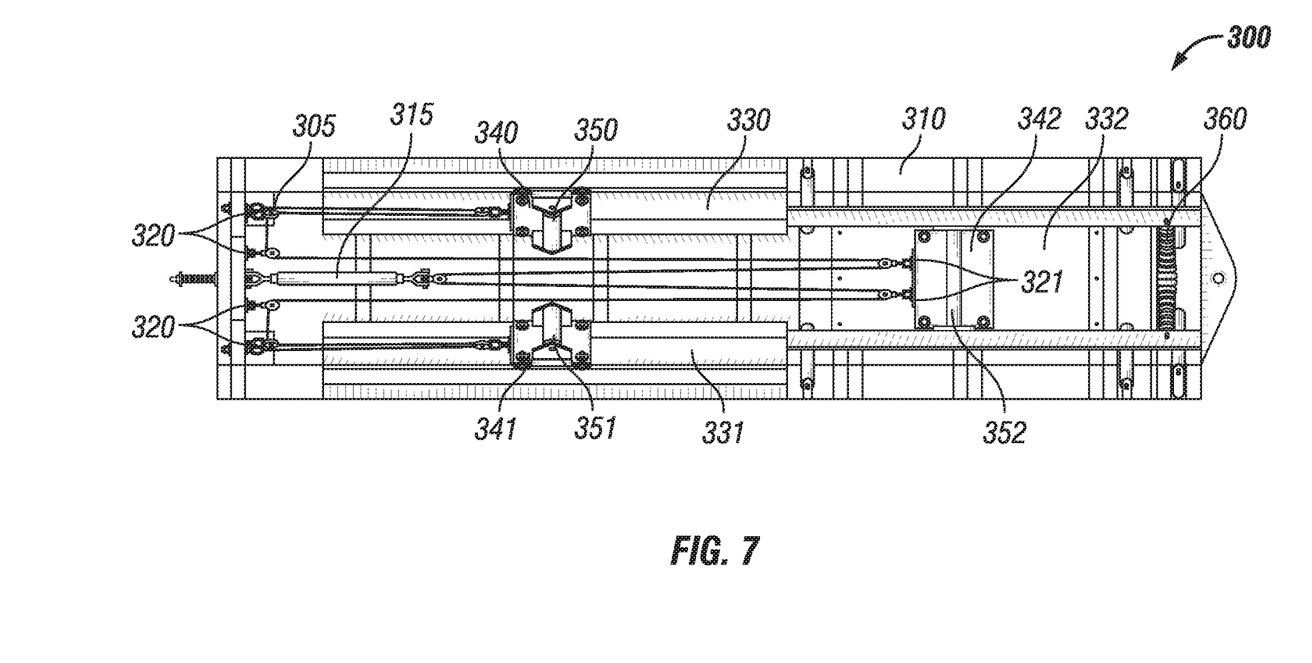
FIGS. 7-9 show an embodiment of a take-up system.
Figure 8:
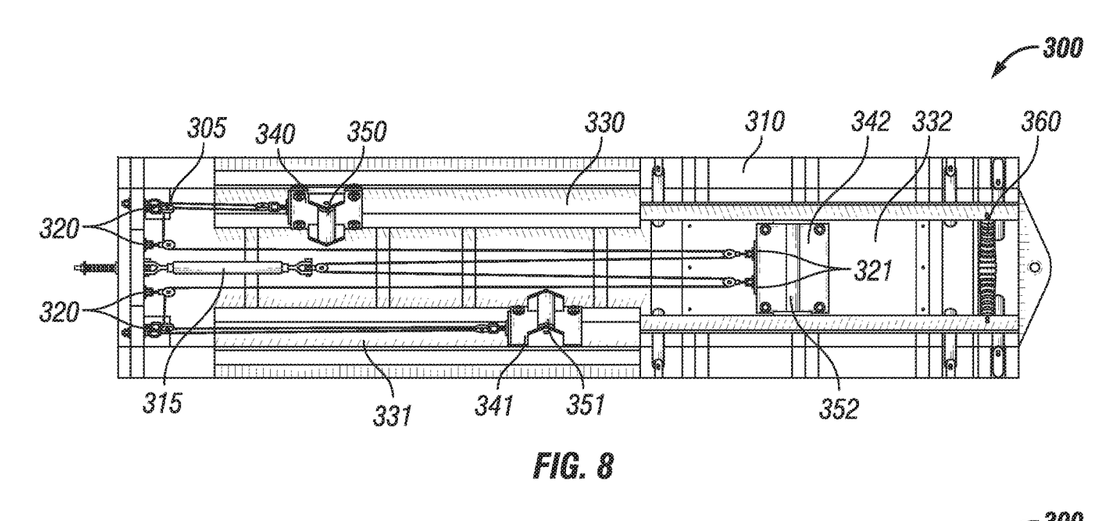
Figure 9:
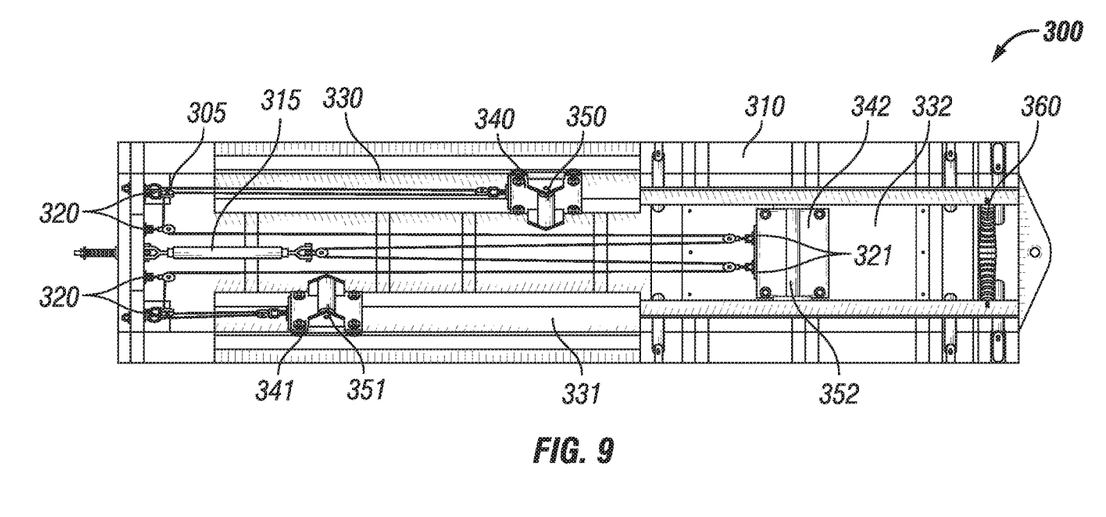

In some embodiments, the train 200 is configured to operate on a curved section of track in addition to a straight section of track. The material upon the payload conveyor belt system 220 may keep tension upon the belts as the train 200 is operated on a curve. The train 200 may include a take-up system 300 configured to apply and maintain tension on the conveyor belts. FIGS. 7-9 show an embodiment of a take-up system 300. FIG. 7 shows the take-up system 300 in a central position. FIG. 8 shows the take-up system 300 in a first take-up position. FIG. 9 shows the take-up system 300 in a second take-up position. The take-up system 300 includes a cable 305, a frame 310, pulleys 320, 321, a first track 330, a second track 331, a first trolley 340, and a second trolley 341. The first track 330 and second track 331 are disposed upon the frame 310. The first trolley 340 is disposed on the first track 330 and the second trolley 341 is disposed on the second track 331. Both the first trolley 340 and the second trolley 341 are connected to the cable 305, which travels through the pulleys 320, 321. A turnbuckle 315 may be used to adjust the relative tension of the cable 305 within the take-up system 300. Alternatively a hydraulic cylinder, winch, or other mechanized device may apply tension to the cable 305. The take-up system 300 may be positioned near the loading section of a train. Alternatively, the take-up system 300 may be in other sections of the train.

The first trolley 340 includes a first tail pulley 350 connected to a first sidewall conveyor belt and the second trolley 341 includes a second tail pulley 351 connected to a second sidewall conveyor belt. The take-up system 300 may include a third track 332 and a third trolley 342. For example, the conveyor belt system may include three conveyor belts and three trolleys. The third trolley 342 is disposed on the third track 332 and is connected to the cable 305 which travels through the pulleys 321 connected to the third trolley 342. The third trolley 342 includes a third tail pulley 352 connected to a floor conveyor belt. As tension is applied to the trolleys 340, 341, 342 via the cable 305, tension is applied to the respective conveyor belts via each tail pulley 350, 351, 352. The tension applied to the third trolley 342 may be independent of the tension applied to the first trolley 340 and the second trolley 341. In some embodiments, the tension within the first trolley 340 and the second trolley 341 may be proportional to the tension applied through the third trolley 342. For example, as shown in FIGS. 7-9, the first trolley 340 and the second trolley 341 may each form a 2:1 pulley system with the cable 305 attached to the frame 310 at one end. The third trolley 342 may include two pulleys 321 that form a 4:1 pulley system with the cable 305. Since the cable 305 is fixed at each end, the tension applied to the third trolley 342 will be approximately double the tension applied to the first trolley 340 and the second trolley 341. Greater tension may be needed for a floor conveyor belt that supports a greater load than the side conveyor belts. In some embodiments, the cable 305 may be a plurality of cables with various connections points to determine the proportional ratio of tension applied to each trolley 340, 341, 342 as would be appreciated by one of ordinary skill in the art having the benefit of this disclosure.

Additional idler pulleys 360 may support the conveyor belt system as would be appreciated by one of ordinary skill in the art having the benefit of this disclosure. When the train is traveling on a straight section of track and the first sidewall section and the second sidewall section are under a similar load, the take-up system 300 may be in a central position, as shown in FIG. 7. However, when the train traverses a curved section of track, the relative tension between the sidewalls may change. For example, as the train traverses the curved section of track, the portion of the sidewall on the outside of the curve is elongated and placed under tension while the portion of the sidewall on the inside of the curve is compressed.

Referring to FIG. 8, as the outside sidewall it placed in tension, the second trolley 341 is moved along the track 331 towards the front of the train. As a result of the forward movement of the second trolley 341, the cable 305 is moved through the pulleys 320, 321 and pulls the first trolley 340 connected to the inside sidewall towards the rear of the train. As a result, the tension from the outside sidewall is transferred into the inside sidewall to maintain tension on the inside sidewall. Referring to FIG. 9, when the train travels through an opposite curve, the first trolley 340 moves forward and the cable 305 is used to transfer tension into the second trolley 341 of the other sidewall and maintain tension on the inside sidewall. In some cases, however, the material disposed upon the conveyor belt system may hold the conveyor belts in place as the train traverses a curve.

A variety of modifications and combinations of these embodiments will be understood by those skilled in the art having the benefit of this disclosure. For example, in some embodiments the entire sidewall section moves with the material loaded into the rail car. In other embodiments, each sidewall section may be formed of multiple conveyor belts spaced along the height of the sidewall section and only the conveyor belts that are contacting the material may move with the material. In some embodiments, substantially all of the sidewall is formed of a conveyor belt that moves with the material. In some embodiments, portions of the sidewall are stationary, but a reduction in friction is realized over known systems where the entire sidewall is stationary. For example, the sidewalls may alternate between stationary portions and moving portions. Also for example, the moveable sidewalls may extend along the length of a rail car but an end portion of the rail car may still include a stationary sidewall. The force needed to convey the material is still reduced because of the moveable sidewalls, but the stationary sidewall portion may assist with transferring material between rail cars. Likewise, stationary sidewalls at the end portion may reduce stresses placed on the belts in a curve. The moving floor may continue to convey the material toward an offloading end as the material sides along a stationary portion of the sidewall. The moveable sidewalls may assist with placing the material into motion so that when the material contacts a stationary portion of sidewall there is sliding friction, but the sliding friction is less than that static friction that would need to be initially overcome in a system with only stationary sidewalls.

Although this disclosure has been described in terms of certain preferred embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. A method of loading or unloading material from a train, the method comprising:
    depositing material onto a conveyor belt system spanning at least one rail car of a train, the conveyor belt system having a first end, a second end, and at least one conveyor belt, the at least one conveyor belt forming sidewalls and a floor, the sidewalls extending from the first end to the second end, the sidewalls contacting the material when loaded upon the at least one rail car;
    containing the material within the at least one conveyor belt while the train is in transport and the at least one conveyor belt is stationary; and
    rotating the at least one conveyor belt to move the material toward the second end.

2. The method of claim 1, wherein the sidewalls include a pair of sidewall conveyor belts, the at least one conveyor belt including the pair of sidewall conveyor belts, the conveyor belt system including a take-up system, and further comprising transferring tension from the sidewall conveyor belt on an outside of a curve to the sidewall conveyor belt on an inside of the curve when the conveyor belt system is positioned in the curve.

3. The method of claim 1, further comprising:
    positioning the at least one conveyor belt in a carry configuration forming a trough shape at the first end of the conveyor belt system, the material being deposited into the trough shape; and
    positioning the at least one conveyor belt in a return configuration at the second end of the conveyor belt system.

4. The method of claim 3, wherein the conveyor belt system does not elevate the material from the first end to the second end.

5. The method of claim 3, wherein the at least one rail car does not include a separate hopper positioned above the conveyor belt system.

6. The method of claim 5, further comprising unloading the material after moving the material toward the second end.

7. The method of claim 6, wherein the material includes at least rip rap.

8. The method of claim 5, further comprising:
    depositing the material onto the at least one conveyor belt at a first section of the conveyor belt system;
    rotating the at least one conveyor belt to move at least a portion of the material to a second section of the conveyor belt system; and
    depositing an additional material into the first section.

9. The method of claim 8, wherein the additional material is track spoils.

10. The method of claim 3, wherein the at least one rail car is a plurality of rail cars and the conveyor belt system spans the plurality of rail cars.

11. The method of claim 3, wherein the at least one conveyor belt is a plurality of conveyor belts.

12. The method of claim 11, wherein the sidewalls include a pair of sidewall conveyor belts and the floor is a floor conveyor belt, the plurality of conveyor belts including the pair of sidewall conveyor belts and the floor conveyor belt, and the positioning the at least one conveyor belt in the return configuration comprises separating the sidewall conveyor belts from the floor conveyor belt.

13. The method of claim 12, wherein each of the pair of sidewall conveyor belts includes an edge and the floor conveyor belt includes ridges, and further comprising positioning the ridges adjacent to the edges of the sidewall conveyor belts to form the carry configuration.

14. The method of claim 12, further comprising driving only the floor conveyor belt.

15. A method of loading or unloading material from a train, the method comprising:
depositing material onto a moving wall system spanning a plurality of rail cars of a train, the moving wall system having a first end, a second end, and a trough, the trough shaped to contain the material and including sidewalls extending from the first end to the second end, and the plurality of rail cars does not include a hopper positioned above the trough;
containing the material within the trough while the train is in transport and the trough is stationary; and
moving the sidewalls towards the second end to move the material toward the second end.

16. The method of claim 15, further comprising:
depositing the material onto a first section of the moving wall system; and
depositing an additional material into the first section after the material is moved to a second section of the moving wall system.

17. The method of claim 16, wherein the additional material is track spoils.

18. The method of claim 15, wherein the moving wall system includes a plurality of conveyor belts, the sidewalls including a pair of sidewall conveyor belts, the plurality of conveyor belts including the pair of sidewall conveyor belts and a floor conveyor belt, and
further comprising:
positioning the plurality of conveyor belts in a carry configuration forming the trough at the first end of the moving wall system; and
positioning the plurality of conveyor belts in a return configuration at the second end of the moving wall system by separating the sidewall conveyor belts from the floor conveyor belt.

19. The method of claim 18, wherein each of the pair of sidewall conveyor belts includes an edge and the floor conveyor belt includes ridges, and further comprising positioning the ridges adjacent to the edges of the sidewall conveyor belts to form the carry configuration.

20. The method of claim 18, wherein the moving wall system does not elevate the material from the first end to the second end.

21. A method of loading or unloading material from a train, the method comprising:
depositing material onto a conveyor belt system spanning at least one rail car of a train, each of the at least one rail car including a frame and the conveyor belt system includes a plurality of pulleys connected to and suspended from the frame, the conveyor belt system having a first end, a second end, and at least one conveyor belt supported upon the plurality of pulleys, the at least one conveyor belt forming sidewalls and a floor, the sidewalls extending from the first end to the second end, the sidewalls contacting the material when loaded upon the at least one rail car;
positioning the at least one conveyor belt in a carry configuration forming a trough shape at the first end of the conveyor belt system, the material being deposited into the trough shape;
transporting the material by moving the at least one rail car along a railroad track while containing the material within the trough shape;
rotating the at least one conveyor belt to move the material toward the second end;
unloading the material after moving the material toward the second end; and
positioning the at least one conveyor belt in a return configuration at the second end of the conveyor belt system.

22. The method of claim 21, further comprising:
depositing the material onto the at least one conveyor belt at a first section of the conveyor belt system;
rotating the at least one conveyor belt to move at least a portion of the material to a second section of the conveyor belt system; and
depositing an additional material into the first section.

* * * * *